United States Patent Office 3,433,748
Patented Mar. 18, 1969

3,433,748
PROCESS FOR FORMING SILICA-ALUMINA
HYDROCARBON CONVERSION CATALYSTS
John S. Magee, Jr., Baltimore, and Warren S. Briggs, Silver spring, Md., assignors to W. R. Grace & Co., New York, N.Y., a corporation of Connecticut
No Drawing. Filed Sept. 27, 1965, Ser. No. 490,726
U.S. Cl. 252—453      12 Claims
Int. Cl. B01j *11/40;* C01b *33/20*

ABSTRACT OF THE DISCLOSURE

Silica-alumina hydrocarbon conversion catalysts having a surface area less than 400 m.$^2$/g. are prepared by several variations of a basic process. In general, a silica-alumina gel slurry is formed and then the gel is separated, washed and dried. In the first variation, an alkali metal silicate solution and part of an aluminum salt solution is gelled, then the remainder of the latter is mixed in while the reaction mixture pH is kept within the 7 to 9 range by aqueous ammonia solution additives. In the second variation, the remainder of the aluminum salt solution is added before the pH is adjusted up to the 7 to 9 range. In the third variation, the alkali metal silicate solution is mixed with all of the aluminum salt solution and then the pH is adjusted up to the 7 to 9 range. The separated gels are washed with weak acid solutions, but when the alumina content is over 30 percent, an ammonium carbonate solution is used.

This application is directed to a process for forming hydrocarbon conversion catalysts. In particular, this application is directed to a process for forming silica-alumina hydrocarbon conversion catalysts having a surface area of less than 400 m.$^2$/g.

In summary, a process of this invention for forming silica-alumina hydrocarbon conversion catalysts having a surface areas of less than 400 m.$^2$/g. comprises the steps of gelling an alkali metal silicate solution with an aluminum salt solution, the quantity of aluminum salt solution employed being insufficient to lower the reaction mixture pH below 7; mixing the gel with an additional quantity of an aluminum salt solution sufficient to provide from 10 to 50 weight percent alumina in the silica-alumina product while maintaining the pH of the reaction mixture within the range of from 7 to 9 with an aqueous ammonia solution; separating the silica-alumina gel from the reaction mixture; and washing and drying the gel.

In summary, an alternative process of this invention for forming silica-alumina hydrocarbon conversion catalysts having surface areas of less than 400 m.$^2$/g. comprises the steps of gelling an alkali metal silicate solution with an aluminum salt solution, mixing the gelled product with an additional quantity of an aluminum salt solution sufficient to provide from 10 to 50 weight percent alumina in the silica-alumina product; mixing the silica-alumina gel with a quantity of an aqueous ammonia solution sufficient to raise the gel pH to within the range of from 7 to 9; separating the gel from the reaction mixture; and washing and drying the gel.

In summary, another process of this invention for forming silica-alumina hydrocarbon conversion catalysts having surface areas of less than 400 m.$^2$/g. comprises the steps of mixing an alkali metal silicate solution with a quantity of an aluminum salt solution sufficient to provide from 10 to 50 weight percent alumina in the silica-alumina product; mixing the reaction mixture with a quantity of an aqueous ammonia solution sufficient to raise the reaction mixture pH to within the range of from 7 to 9, whereby a silica-alumina gel is formed; separating the gel from the reaction mixture; and washing and drying the gel.

Silica-alumina gels have been used for many years as catalysts and as matrices for hydrocarbon conversion catalysts. Many processes have been developed for forming such catalysts. The most common process comprises formation of a silica gel by mixing an alkali metal silicate solution with an acid, mixing the silica gel with an aluminum salt solution, and precipitating the alumina in the persence of this silica gel by the addition of an alkaline reagent. Formation of silica-alumina gels by cogelation, i.e., forming the silica and alumina gel components simultaneously in the presence of each other, has been attempted for many years. Direct reaction of aluminum salt solutions and alkali metal silicate solutions to form silica-alumina cogels has been studied for many years. Such a process has many advantages. The principal advantages involve the use of fewer reactants in that the acidic characteristics of the aluminum salt solution are employed to provide the requisite acid reaction with the alkali metal silicate solution. Therefore, a smaller quantity of acid is necessary. Also, a more homogeneous gel product is theoretically possible. However, a successful commercial process has not previously been developed for forming silica-alumina cogels by this method which have the desired catalytic activity and surface areas below 400 m.$^2$/g. The silica-alumina processes most commonly employed today are variations of the multi-step process described above.

It is one object of this invention to provide a cogelation process for forming silica-alumina gels which are active hydrocarbon conversion catalysts.

It is another object of this invention to provide a process for forming silica-alumina cogels having surface areas of less than 400 m.$^2$/g.

All concentrations are herein given in terms of weight percent unless otherwise provided.

In the processes of this invention, the alumina is precipitated in a reaction medium having a pH within the range of from 7 to 9.

The alkali metal silicate solution employed in the process of this invention can be an aqueous solution containing sodium silicate, potassium silicate, and the like. The silica to alkali metal oxide (expressed as sodium oxide) weight ratio of the alkali metal silicate can be within the range of from 2.5:1 to 3.5:1. The alkali metal silicate solution should have a silicate content, expressed as silica, of from 2 to 10 percent and preferably from 4.0 to 6.0 percent.

The aluminum salt solution can be an aqueous solution containing aluminum sulfate, aluminum chloride, aluminum nitrate, and the like. The pH control of the reaction mixtures is obtained with aqueous ammonia solutions containing from about 10 to 28 percent ammonium hydroxide.

In general, the process of this invention comprises the steps of forming a silica-alumina gel slurry, and separating, washing, and drying the gel.

In one process of this invention, the alkali metal silicate solution is gelled with an aluminum salt solution, and the remainder of the aluminum salt solution is mixed with the gel while maintaining the reaction mixture pH within the range of from 7 to 9 by the addition of an aqueous ammonia solution. Preferably, the aluminum salt solution is added to the alkali metal silicate solution, and gelation occurs at a pH of about 10.4.

In another process of this invention, the alkali metal silicate solution is gelled as described above, and the remainder of the aluminum salt solution is added without pH control. The reaction mixture becomes acid, and the gel appears to be redispersed. The pH of the mixture is then raised to within the range of from 7 to 9 by the addition of an aqueous ammonia solution, effecting precipitation of the alumina within this pH range.

In still another process of this invention, the alkali metal silicate solution is mixed with the entire quantity of the aluminum salt solution to be added without pH control, forming an acid reaction mixture. Then a quantity of an aqueous ammonia solution is added sufficient to adjust the reaction mixture pH to within the range of from 7 to 9. Silica gel formation and alumina precipitation are then effected within the stated pH range.

In each of the processes, the total quantity of the aluminum salt solution employed is sufficient to provide from 10 to 50 and preferably from 13 to 40 percent alumina in the silica-alumina product.

The reactants can be mixed by any conventional technique which will provide uniform mixing and which will permit maintenance of the reaction pH within the specified range. For example, the alkali metal silicate solution and aluminum salt solution can be introduced into a mixing valve as separate streams at such rates as will provide a reaction mixture having the desired pH range. Alternatively, the aluminum salt solution can be added to the alkali metal silicate solution contained in a reaction vessel having an agitator. The temperature of the reaction mixture should be maintained within the range of from 70 to 160° F. during gel formation. Therefore, it may be desirable under certain circumstances that adequate heating and/or cooling means be provided in the reaction vessel.

The next step in the processes of this invention comprises separation of the silica-alumina hydrogel from the reaction mixture. The separation can be obtained by any conventional technique, such as filtration or the like.

The subsequent steps in the process are largely dependent upon the size of the final product desired. For the production of fluid hydrocarbon conversion catalysts, several alternate procedures can be followed. In one procedure, the separated silica-alumina gel product can be reslurried and spray dried to form particles having the desired size. The spray-dried particles can be washed, dried, and activated to form a fluid catalyst. In an alternate procedure, the separated silica-alumina gel can first be dried in an oven or similar device. The oven-dried silica-alumina gel can then be ground to a fine powder and screened, if necessary, to provide catalyst particles having the size distribution required for fluid catalytic processes. The fine, sized powders can then be washed, dried, and activated as desired.

For the production of silica-alumina gel products having a larger particle size, the silica-alumina gel can be dried in the form of a filter cake. The dried cake can then be broken into smaller particles, washed, dried, and activated to form granular products. Granular silica-alumina products in the form of balls, pills, extrudates, and the like can be formed from the spray-dried or ground powders described above by conventional processes.

The washing procedure comprises contacting the silica-alumina gel particles with solutions which effect the removal of residual cations derived from the alkali metal silicate solution and anions derived from the aluminum salt solution. Several washing procedures can be followed, depending upon the amount of alumina present in the gel. If the alumina content of the silica-alumina gel is less than 30 percent, adequate removal of the contaminating ions from the silica-alumina gel can be obtained by first washing the gel with an acidic solution such as a dilute aqueous hydrochloric acid solution or an ammonium sulfate solution. The pH of the acid wash solution should be within the range of from 5 to 7. Aqueous solutions containing from 2 to 10 percent ammonium sulfate are suitable. The acid wash is continued until the alkali metal cation content of the gel is sufficiently low, preferably less than 0.1 percent. Then the silica-alumina gel can be washed with a weak ammonia solution to obtain removal of residual contaminating anions such as sulfate ions. The pH of the weak ammonia solution should be within the range of from 7 to 10.

If the alumina content of the silica-alumina gel is greater than about 30 percent, ammonia solutions have been found incapable of removing contaminating anions such as sulfate ions from the silica-alumina gel to the low levels required for hydrocarbon conversion catalysts, preferably less than 1.0 percent. When the higher alumina concentrations are present in the gel, washing the gel with an ammonium carbonate solution has been found to be highly effective to remove sulfate ions to very low levels. The ammonium carbonate wash solution should have a concentration within the range of from 1 to 5 percent ammonium carbonate. The wash solutions should preferably have a temperature within the range of from 100 to 140° F. Washing of the silica-alumina gel with the aqueous ammonium solution, the ammonium carbonate solution or both should be continued until the anion content, expressed as sulfate, of the silica-alumina gel is less than 1.0 wt. percent. A final wash with deionized water can also be employed.

The washed silica-alumina gel is then dried at a temperature of from 250 to 450° F. until the gel has a water content of less than 25 percent.

Silica-alumina hydrocarbon conversion catalysts produced by the process of this invention have been found to provide an increased catalytic activity and lower gas and carbon factors than previously known silica-aluminum cogels obtained by the direct reaction of alkali metal silicate solutions with aluminum salt solutions.

IRA (Indiana Relative Acitivity) measurements, and carbon and gas factors determinations were made with the silica-alumina gel produced by the process of this invention as described in the articles by A. L. Conn, W. F. Neehen, and R. D. Shankland, Chem. Eng. Prog., 176 (April, 1950).

This invention is further illustrated by the following specific but non-limiting examples.

EXAMPLE 1

This example shows the process of this invention for making a silica-alumina cogel wherein pH control is maintained throughout the mixing of the alkali metal silicate solution with the aluminum salt solution.

A sodium silicate solution was prepared having a weight of 3000 g. and containing 5.5% silicate, expressed as silica. An aluminum sulfate solution was prepared by dissolving 420 g. of aluminum sulfate in sufficient water to provide 2.5 liters of solution. The aluminum sulfate solution was slowly added to the silicate solution, and incremental additions of an ammonium hydroxide solution were made to maintain the reaction mixture pH within the range of from 7 to 9. The silicate gelled after 620 ml. of the aluminum sulfate solution had been added. The pH regulation of the reaction mixture within the range of from 7 to 9 was maintained with further additions of ammonium hydroxide until all of the aluminum sulfate solution had been added. After all of the aluminum sulfate solution had been added, 225 ml. of a concentrated ammonium hydroxide solution was added to raise the gel pH to 8.5.

The silica-alumina gel was filtered from the reaction mixture and dried at a temperature of 230° F. for 18 hours. The gel was then ground in a micropulverizer and washed. The gel was washed with four 800 ml. portions of an aqueous 4% ammonium sulfate solution, with 800 ml. portions of an aqueous 5% ammonium carbonate solution, and then with 800 ml. of deionized water. The temperature of the wash solution was 140° F., and the gel was filtered and reslurried between each wash. Then the silica-alumina gel was dried at 400° F. for 2 hours.

The silica-alumina cogel was analyzed to determine the sodium content, expressed as sodium oxide, and the sulfate content. The cogel was also tested to determine the surface area, pore volume, and poor diameter, by standard techniques. The results obtained are shown in Table A, under Sample 1.

EXAMPLE 2

This example shows the process of this invention wherein pH regulation within the range of from 7 to 9 is maintained only until the initial silica-alumina gel is obtained.

A sodium silicate solution and an aluminum sulfate solution were prepared as described in Example 1. The aluminum sulfate solution was slowly added to the sodium silicate solution with incremental additions of an aqueous ammonium hydroxide solution sufficient to maintain the reaction mixture pH within the range of from 7 to 9. The silicate gelled after 620 ml. of the aluminum sulfate solution had been added. The remainder of the aluminum sulfate solution was then added with no further pH regulation. After the aluminum sulfate solution addition was complete, 225 ml. of concentrated ammonium hydroxide were added to raise the pH of the gel mixture to 8.5.

The final silica-alumina cogel was then filtered, dried, pulverized, washed and redried as described in Example 1. The final silica-alumina cogel product was then tested as described in Example 1, and the results are shown in Table A, under Sample 2.

EXAMPLE 3

This example shows the process of this invention wherein the reactants are rapidly mixed, and formation of the silica-alumina gel is obtained when the reaction mixture pH is within the range of from 7 to 9.

A 15,000 g. quantity of a sodium silicate solution was prepared containing 5.5 wt. percent silica. An aluminum sulfate solution was prepared by dissolving 3614 g. of aluminum sulfate (approximately 548 g. $Al_2O_3$) in water to form 12.4 liters of solution. The aluminum sulfate solution was rapidly mixed with the sodium silicate solution with vigorous agitation. Then 2.2 liters of concentrated ammonium hydroxide solution (28% $NH_3$) was rapidly added to the reaction mixture with vigorous agitation.

The silica-alumina gel product was filtered and dried at 220° F. for 16 hours. The dried material was then washed as described in Example 1. The washed gel was then dried at 400° F. for 3 hours.

The final silica-alumina cogel was tested as described in Example 1. Further tests to determine the Indiana Relative Activity, gas producing factor, and carbon producing factor of the cogel were also made. The results of these tests are shown in Table A, under Sample 3.

EXAMPLE 4

This example is similar to Example 1, showing careful pH control within the range of from 7 to 9 throughout mixing of the reactants.

Sodium silicate and aluminum sulfate solutions were prepared by the procedure described in Example 3. The aluminum sulfate solution was slowly added to the sodium silicate solution while the pH of the reaction mixture was maintained within the range of from 7 to 9 by the incremental addition of concentrated ammonium hydroxide solution. The total quantity of ammonium hydroxide solution added was the same as in Example 3, 2.2 liters. The silica-alumina gel was filtered, dried, washed, and redried by the procedure described in Example 3.

The silica-alumina cogel was tested as described in Example 3, and the results obtained are shown in table under Sample 4.

TABLE

| Sample No. | 1 | 2 | 3 | 4 |
|---|---|---|---|---|
| $Al_2O_3$ content, wt. percent | 28 | 28 | 40 | 40 |
| $Na_2O$ content, wt. percent | 0.028 | | 0.059 | 0.046 |
| $SO_4$ content, wt. percent | 0.53 | 0.60 | 0.35 | 0.27 |
| Surface area | 344 | 329 | 299 | 332 |
| Pore volume | 0.55 | 0.66 | 0.54 | 0.58 |
| Pore diameter | 64 | 80 | 72 | 70 |
| IRA | | | 71.5 | 78.2 |
| GPF | | | 1.11 | 1.15 |
| CPF | | | 0.72 | 0.77 |

Obviously, many modifications and variations of the invention as hereinabove set forth may be made without departing from the essence and scope thereof, and only such limitations should be applied as are indicated in the claims.

What is claimed is:

1. A process for forming a silica-alumina hydrocarbon conversion catalyst having a surface area of less than 400 m.²/g. comprising the steps of:
  (a) gelling an alkali metal silicate solution with an aluminum salt solution,
  (b) mixing the gel with an additional quantity of an aluminum salt solution sufficient to provide from 10 to 50 wt. percent alumina in the silica-alumina product while maintaining the pH of the reaction mixture within the range of from 7 to 9 with an aqueous ammonia solution,
  (c) separating the gel from the reaction mixture, and
  (d) washing and drying the gel.

2. The process of claim 1 wherein the alkali metal silicate solution has a silica to alkali metal oxide ratio of from 2.5 to 3.5:1 and a silicate concentration of from 4 to 6 wt. percent silica.

3. The process of claim 1 wherein the gel is washed by contacting it with an acidic solution which is substantially free from alkali metal ions and having a pH within the range of from 5 to 7, and by then contacting it with an ammonia solution having a pH within the range of from 7 to 9.

4. A process for forming a silica-alumina hydrocarbon conversion catalyst having a surface area of less than 400 m.²/g. comprising the steps of:
  (a) gelling an alkali metal silicate solution with an aluminum salt solution,
  (b) mixing the gel with an additional quantity of an aluminum salt solution sufficient to provide from 30 to 50 wt. percent alumina in the silica-alumina catalyst while maintaining the pH of the reaction mixture within the range of from 7 to 9 with an aqueous ammonia solution,
  (c) separating the gel from the reaction mixture,
  (d) washing the gel with an acidic solution which is substantially free of alkali metal ions and having a pH within the range of from 5 to 7,
  (e) washing the gel with an ammonium carbonate solution, and
  (f) drying the gel.

5. A process for forming a silica-alumina hydrocarbon conversion catalyst having a surface area of less than 400 m.²/g. comprising the steps of:
  (a) gelling an alkali metal silicate solution with an aluminum salt solution,
  (b) mixing the gel with an additional quantity of an aluminum salt solution sufficient to provide from 10 to 50 wt. percent alumina in the silica-alumina product,
  (c) mixing the reaction mixture with a quantity of an aqueous ammonium solution sufficient to raise the pH to within the range of from 7 to 9, (d) separating the gel from the reaction mixture, and
(e) washing and drying the gel.

6. The process of claim 5 wherein the alkali metal silicate solution has a silica to alkali metal oxide ratio of from 2.5 to 3.5:1 and a silicate concentration of from 4 to 6 wt. percent silica.

7. The process of claim 5 wherein the gel is washed by contacting it with an acidic solution which is substantially free from alkali metal ions and having a pH within the range of from 5 to 7, and by then contacting it with an ammonia solution having a pH within the range of from 7 to 9.

8. A process for forming a silica-alumina hydrocarbon conversion catalyst having a surface area of less than 400 m.$^2$/g. comprising the steps of:
(a) gelling an alkali metal silicate solution with an aluminum salt solution,
(b) mixing the gel product with an additional quantity of an aluminum salt solution sufficient to provide from 30 to 50 wt. percent alumina in the silica-alumina product,
(c) mixing the reaction mixture with a quantity of an aqueous ammonia solution sufficient to raise the pH to within the range of from 7 to 9,
(d) separating the silica-alumina gel from the reaction mixture,
(e) washing the gel with an acidic solution which is substantially free of alkali metal ions and having a pH within the range of from 5 to 7,
(f) washing the gel with an aqueous ammonium carbonate solution, and
(g) drying the gel.

9. A process for forming a silica-alumina hydrocarbon conversion catalyst having a surface area of less than 400 m.$^2$/g. comprising the steps of:
(a) mixing an alkali metal silicate solution with a quantity of an aluminum sulfate solution sufficient to provide from 10 to 50 wt. percent alumina in the silica-alumina product,
(b) mixing the reaction mixture with a quantity of an aqueous ammonia solution sufficient to raise the reaction mixture pH to within the range of from 7 to 9, whereby a silica-alumina gel is formed,
(c) separating the gel from the reaction mixture, and
(d) washing and drying the gel.

10. The process of claim 9 wherein the alkali metal silicate solution has a silica to alkali metal oxide ratio of from 2.5 to 3.5:1 and a silicate concentration of from 4 to 6 wt. percent silica.

11. The process of claim 9 wherein the gel is washed by contacting it with an acidic solution which is substantially free from alkali metal ions and having a pH within the range of from 5 to 7, and by then contacting it with an ammonia solution having a pH within the range of from 7 to 9.

12. A process for forming a silica-alumina hydrocarbon conversion catalyst having a surface area of less than 400 m.$^2$/g. comprising the steps of:
(a) mixing an alkali metal silicate solution with a quantity of an aluminum salt solution sufficient to provide from 30 to 50 wt. percent alumina in the silica-alumina product,
(b) mixing the reaction mixture with a quantity of an aqueous ammonia solution sufficient to raise the gel pH to within the range of from 7 to 9, whereby a silica-alumina gel is formed,
(c) separating the silica-alumina gel from the reaction mixture,
(d) washing the gel with an acidic solution which is substantially free of alkali metal ions and having a pH within the range of from 5 to 7,
(e) washing the gel with an aqueous ammonium carbonate solution, and
(f) drying the gel.

References Cited

UNITED STATES PATENTS 2,315,024   3/1943   Sturgeon _____ 252—453 X

DANIEL E. WYMAN, *Primary Examiner.*

C. F. DEES, *Assistant Examiner.*

U.S. Cl. X.R.

252—455